(12) United States Patent
Montagner

(10) Patent No.: US 11,375,729 B2
(45) Date of Patent: Jul. 5, 2022

(54) PREPARATION PROCESS OF BLACK TEA FROM YERBA MATE AND THE RESPECTIVE RESULTING PRODUCT

(71) Applicant: JULIANA MONTAGNER—ME, Ilopolis (BR)

(72) Inventor: Juliana Montagner, Ilopolis (BR)

(73) Assignee: JULIANA MONTAGNER—ME, Ilopolis (BR)

( * ) Notice: Subject to any disclaimer, the term of this patent is extended or adjusted under 35 U.S.C. 154(b) by 0 days.

(21) Appl. No.: 16/616,029

(22) PCT Filed: May 26, 2017

(86) PCT No.: PCT/BR2017/000053
§ 371 (c)(1),
(2) Date: Nov. 22, 2019

(87) PCT Pub. No.: WO2018/213899
PCT Pub. Date: Nov. 29, 2018

(65) Prior Publication Data
US 2020/0085075 A1  Mar. 19, 2020

(30) Foreign Application Priority Data
May 24, 2017 (BR) .......................... 1020170108449

(51) Int. Cl.
A23F 3/34    (2006.01)
A23F 3/16    (2006.01)
A23F 3/22    (2006.01)

(52) U.S. Cl.
CPC ............... *A23F 3/34* (2013.01); *A23F 3/166* (2013.01); *A23F 3/22* (2013.01)

(58) Field of Classification Search
CPC .... A23F 3/163; A23F 3/14; A23F 3/34; A23F 3/18; A23F 3/12; A23F 3/08; A23F 3/166; A23F 3/22; B01D 3/225; B01D 3/22; A61M 11/003; A23L 27/24; A01F 12/34
USPC .................................................. 426/597, 49
See application file for complete search history.

(56) References Cited

U.S. PATENT DOCUMENTS

| | | | | |
|---|---|---|---|---|
| 2,115,411 | A | * | 4/1938 | Cortez ....................... A23F 3/34 426/597 |
| 6,482,450 | B1 | | 11/2002 | Goodsall et al. |
| 2001/0048956 | A1 | * | 12/2001 | Blair ........................ A23F 3/10 426/49 |
| 2003/0064130 | A1 | * | 4/2003 | Blair ........................ A23F 3/14 426/49 |

FOREIGN PATENT DOCUMENTS

| | | |
|---|---|---|
| BR | 0008069 A | 2/2002 |
| CN | 101690534 A | 4/2010 |
| CN | 103461579 A | 12/2013 |
| CN | 105053401 A | 8/2015 |
| CN | 105875877 A | 8/2016 |
| CN | 106666007 A | 5/2017 |
| GB | 189701124 A | 11/1897 |

OTHER PUBLICATIONS

NPL "Tea processing drying" (https://www.elitebar.com) date is 2013: please see Under Leaf Maceration, Picture says 2013 Eli tea and also please consider cited References e.g. "Below Drying" The reference has year Jeng et al., 2010) (Year: 2013).*
NPL Bruce et al. (in the manufacture of the Black Tea, year 1838) (Year: 1838).*
NPL Yuxue et al. ( English machine translation of CN 205233360, May 18, 2016) (Year: 2016).*
NPL Taquara sieves (Retrieved on May 12, 2021). (Year: 2021).*
NPL Wooden frame Hand sieve (Tokyo screen Co., on p. 5, see year 1973) (Year: 1973).*
Wooden sieve to dry tea—Google Scholar search conducted on May 12, 2021 and attached (Year: 2021).*
C.T. Scoparo, "Metabolitos de Camellia sinensis: caracterização estrutural e atividades biológicas," 2016, 121 pages, Tese (Doutorado em Ciencias—Bioquimica)—Departamento de Bioquimica e Biologia Molecular, Universidade Federal do Parana, Curitiba. Item "2.3 Processamento Dos Chas De Camellia Sinensis" (from p. 37).
R.L.T. Matsumoto, 2008, 103 pages, "Atividade antioxidante do chá mate (Ilex paraguariensis)," Dissertacao (Mestrado em Saude Publica)—Faculdade de Saude Publica, Universidade de Sao Paulo, Sao Paulo. itens "2.5. 1. 1 Chimarrao e Terere" e "2.5. 1.2 Cha mate tostado" (start on p. 36).
C.D. Nora, "Erva-mate," 2008, 47 pages, Trabalho academico (Bacharelado de Quimica de Alimentos)—Departamento de Ciencia dos Alimentos, Universidade Federal de Pelotas, Pelotas. item "7 Processamento da erva-mate" (start on p. 29).
International Search Report & Written Opinion for PCT/BR2017/000053, dated Nov. 29, 2017.

\* cited by examiner

*Primary Examiner* — Erik Kashnikow
*Assistant Examiner* — Bhaskar Mukhopadhyay
(74) *Attorney, Agent, or Firm* — Piloff Passino & Cosenza LLP; Sean A. Passino; Rachel K. Pilloff

(57) ABSTRACT

The present invention abstract describes the steps of a process for the preparation of black tea and the respective end product, wherein, in the initial step of the proposed process for producing black tea, the young yerba mate leaves (buds) are subjected to withering for a certain time. Next, the already withered leaves are rolled; next, the fermentation is carried out, and after such fermentation, drying and segregation are performed.

1 Claim, No Drawings

PREPARATION PROCESS OF BLACK TEA FROM YERBA MATE AND THE RESPECTIVE RESULTING PRODUCT

BACKGROUND OF THE INVENTION

Field of the Invention

The following invention specification relates to the process for the preparation of black tea made from yerba mate (*ilex paraguariensis*), and the respective end product.

Description of Related Art

It is known that the use of yerba mate as food is restricted to some regions of South America, where its largest consumption is in the form of mate, a cultural habit. The present product has the potential to compete for consumers worldwide, as it does the *Camellia sinensis* green tea and the black tea, and reach consumers who the mate would not be able to reach.

In order to use the yerba mate, several drying processes are known, for example, those described in PI 9504075-7 comprising a construction having a heat draft system through modular upper outlets with a butterfly valve on each chimney. Inside the oven, two belts are moved in series, in the opposite direction, being one upper belt and one lower belt, and the belts are unloaded by means of load dumpers, consisting of a bladed shaft rotating in the same direction as the belts. A deflector plate directs the yerba mate from the upper belt to the lower belt and to a discharge outlet guiding the yerba mate from the lower belt to the outlet conveyor belt. The furnaces conduct the heat generated to the oven by means of ducts that split into two branches, where a distributor receives the yerba mate from a belt.

MU 7703102-4 describes an equipment for the industrial betterment of yerba mate, wherein it is fed by a vertical duct, and feeds a tilting horizontal chute for the action of two rows of cam-action S-shaped pestles alternating on their rollers, and motor-driven sequentials to grind and create the yerba mate gum, such equipment may be made up of a single row of pestles that, in turn, use wooden or steel beams as a guide, so that the pestles have a free action to reach the bottom of the lower chute provided at its end with a conveyor thread to take the yerba mate in its end form to usual bagging conveyors.

PI 1002236-8 describes a fractionation and scorching process for yerba mate leaves with hot water steam for eliminating toxicity. Briefly, it consists of passing the herb leaves through a water steam bath with controlled and previously calculated temperature in order to prepare the leaf for human consumption. The process is initiated by a primary equipment with saturated steam injection from a water-tube boiler, interconnected to the secondary equipment that receives, through the injectors, the injection of reheated steam at preset pressure and temperature.

An equipment for scorching and drying yerba mate leaves using hot water steam is described in MU 9001057-4, the purpose of which is to eliminate contamination of the yerba mate by PAHs (aromatic polycyclic hydrocarbons) from the scorching and drying process of the yerba mate leaves, the equipment consists of a primary processing module with herb feeding inlet and a secondary processing module with a total of twelve injecting nozzles, being six on each side, coming from the water-tube boiler by means of saturated steam piping and reheated steam piping interconnected to the secondary nozzles, being two on each side and one on the top.

Expanding a form of consumption of yerba mate means introducing into the people's diet the antioxidants contained in such species, which are superior to those of *Camellia sinensis*.

From what is known from the prior art, the direct contact of yerba mate leaves with gases generated in the furnace during the scorching stage can contaminate the raw material with aromatic polycyclic hydrocarbons. They have a high carcinogenic potential, which may remain in the end product intended for the consumer. Not washing the leaves at the beginning of processing is also a problem. The vegetal material may be contaminated by environmental pollutants, microorganisms and small invertebrates.

Thus, the invention is intended to solve the abovementioned drawbacks by modifying how the leaves are processed. In the initial step of the proposed process for the production of black tea, the young leaves (buds) of yerba mate are withered for a certain time. Next, the already withered leaves are rolled, followed by fermentation, after such fermentation the drying and segregation steps are carried out.

DETAILED DESCRIPTION OF THE INVENTION

The embodiment of the invention proposed in this specification is achieved by describing the different steps required for carrying out the present application, such that it can be fully reproduced by means of appropriate technique, thus allowing full characterization of the claimed process functionality.

Based on the different steps described that express the best or preferential way to carry out the process now devised, the descriptive part of the report is based, thus clarifying aspects that may have been presumed, so as to clearly determine the protection now claimed.

These operations may vary, provided that they do not depart from the initially claimed subject matter.

In this case, the products can be generated by different operations.

In the preparation process developed, the young leaves of yerba mate should go through the following steps:
  withering the young leaves (buds) of yerba mate (withering step). The leaves should dehydrate for 12 to 14 hours until they wither, which is the time required to remove 65 to 67% of moisture. One of the ways to do this is as follows: the buds are placed on rectangular wooden sieves having a mesh on the bottom, supported by tripods placed at one meter from the floor. The whole frame surrounding the sieves from the floor to the tripod height will be closed with wood (forming a tunnel) and a hot air fan will be installed at one end. In this step, it is crucial to wither the leaves, and said method may be cited or changed;
  next, it is necessary to extract the juice from the leaves and immediately start rolling the leaves for the first time for 20 minutes (first rolling). In this step, it is crucial to roll the leaves, and said method may be cited or changed;
  next, the oxidation or fermentation process is performed (oxidation or fermentation step), in which the leaves are placed in bamboo sieves near a fan for about one hour. In this step, it is crucial to oxidize/ferment the leaves, and said method may be cited or changed;

next, the drying step is performed in oven at 110° C. for about 24 minutes. In this step, it is crucial to dry the leaves, and said method can be cited or changed, and;

the last step is the segregation/sorting. After drying, larger/whole leaves, broken leaves and particulate leaves are segregated.

The segregation/classification means that the any of the separated large/whole leaf, broken leaf and leaf in particulate may be used to make the black tea from yerba mate.

The invention claimed is:

1. A preparation process of black tea from yerba mate, consisting of the following steps:

withering young leaves (buds) of yerba mate, wherein the young leaves are buds, by dehydrating for 12 to 14 hours in order to remove 65 to 67% moisture, wherein the dehydrating is performed by placing the young leaves on a rectangular wooden sieve with bottom screen, wherein the sieve and bottom screen are supported by a tripod one meter above the floor and wherein the sieve and bottom screen from the floor to the height of the tripod are enclosed with wood, forming a tunnel by installing a hot air fan at one end, extracting juice from the young leaves and immediately rolling the young leaves for the first time for 20 minutes, thereafter performing an oxidation or a fermentation process in which the young leaves are placed in taquara sieves near a fan for about one hour, thereafter performing an oven drying step at 110° C. for about 24 minutes, and, thereafter sorting and separating larger/whole young leaves, broken young leaves and particulate young leaves each of which can be used for making black tea.

* * * * *